(12) United States Patent
Kojima et al.

(10) Patent No.: US 12,544,544 B2
(45) Date of Patent: Feb. 10, 2026

(54) BALLOON FOR BALLOON CATHETER

(71) Applicant: KANEKA CORPORATION, Osaka (JP)

(72) Inventors: Masahiro Kojima, Settsu (JP); Yoshinori Nakano, Settsu (JP); Masato Tsueda, Settsu (JP); Takahisa Hamabuchi, Osaka (JP)

(73) Assignee: KANEKA CORPORATION, Osaka (JP)

( * ) Notice: Subject to any disclaimer, the term of this patent is extended or adjusted under 35 U.S.C. 154(b) by 287 days.

(21) Appl. No.: 18/036,434

(22) PCT Filed: Nov. 15, 2021

(86) PCT No.: PCT/JP2021/041824
§ 371 (c)(1),
(2) Date: May 11, 2023

(87) PCT Pub. No.: WO2022/102766
PCT Pub. Date: May 19, 2022

(65) Prior Publication Data
US 2023/0398335 A1 Dec. 14, 2023

(30) Foreign Application Priority Data
Nov. 16, 2020 (JP) .................. 2020-190296

(51) Int. Cl.
*A61M 25/10* (2013.01)
(52) U.S. Cl.
CPC ...... *A61M 25/104* (2013.01); *A61M 25/1002* (2013.01); *A61M 2025/1086* (2013.01)
(58) Field of Classification Search
CPC .. A61M 2025/1086; A61M 2025/1004; A61M 2025/109; A61M 2025/1088;
(Continued)

(56) References Cited

U.S. PATENT DOCUMENTS 6,013,055 A * 1/2000 Bampos ............ A61M 25/1002
604/103.07
2012/0130407 A1* 5/2012 Aggerholm .... A61B 17/320725
606/159
(Continued)

FOREIGN PATENT DOCUMENTS

JP 2014-506140 A 3/2014
JP 2016-52452 A 4/2016
(Continued)

OTHER PUBLICATIONS

International Search Report (PCT/ISA/210), issued in PCT/JP2021/041824, dated Jan. 25, 2022.
(Continued)

*Primary Examiner* — Anh T Dang
(74) *Attorney, Agent, or Firm* — Birch, Stewart, Kolasch & Birch, LLP

(57) ABSTRACT

Disclosed is a balloon for a balloon catheter that can be easily folded to facilitate insertion into and through a body cavity and prevent elongation of the balloon in the longitudinal axis direction. A balloon satisfies at least one of: (I) a distal tapered part (24) has a first part (610) having an inner protrusion part (61) and a second part (620) not having the inner protrusion part (61), and the distal tapered part (24) has an outer protrusion part (62) in the entire extent of the second part (620); and (II) a proximal tapered part (22) has a first part (610) having an inner protrusion part (61) and a second part (620) not having the inner protrusion part (61), and the proximal tapered part (22) has an outer protrusion part (62) in the entire extent of the second part (620).

16 Claims, 8 Drawing Sheets

(58) Field of Classification Search
CPC .. A61M 2025/1015; A61M 2025/1031; A61M 10/1047
See application file for complete search history.

(56) References Cited

U.S. PATENT DOCUMENTS

| | | |
|---|---|---|
| 2015/0360007 A1 | 12/2015 | Schneider et al. |
| 2015/0360008 A1 | 12/2015 | Schneider et al. |
| 2016/0128718 A1 | 5/2016 | Aggerholm et al. |
| 2021/0113820 A1* | 4/2021 | Okamoto ............ A61M 25/104 |
| 2021/0113821 A1* | 4/2021 | Okamoto .......... A61M 25/1002 |

FOREIGN PATENT DOCUMENTS

| | | |
|---|---|---|
| JP | 2017-522078 A | 8/2017 |
| WO | WO 2020/012850 A1 | 1/2020 |
| WO | WO 2020/012851 A1 | 1/2020 |

OTHER PUBLICATIONS

Written Opinion of the International Searching Authority (PCT/ISA/237), issued in PCT/JP2021/041824, dated Jan. 25, 2022.

* cited by examiner

[FIG. 1]
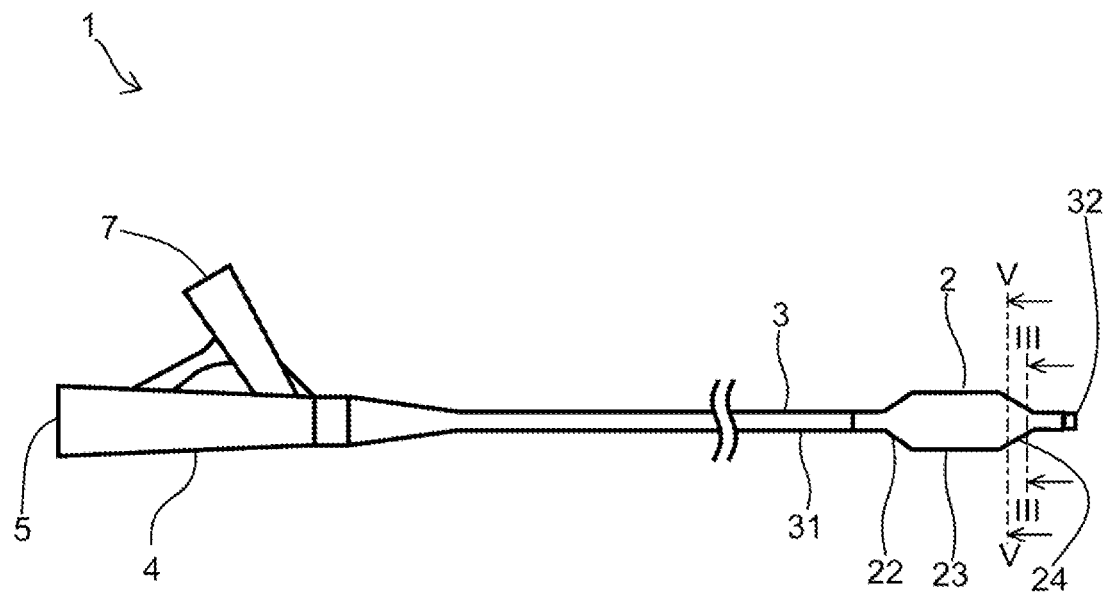
[FIG. 2]
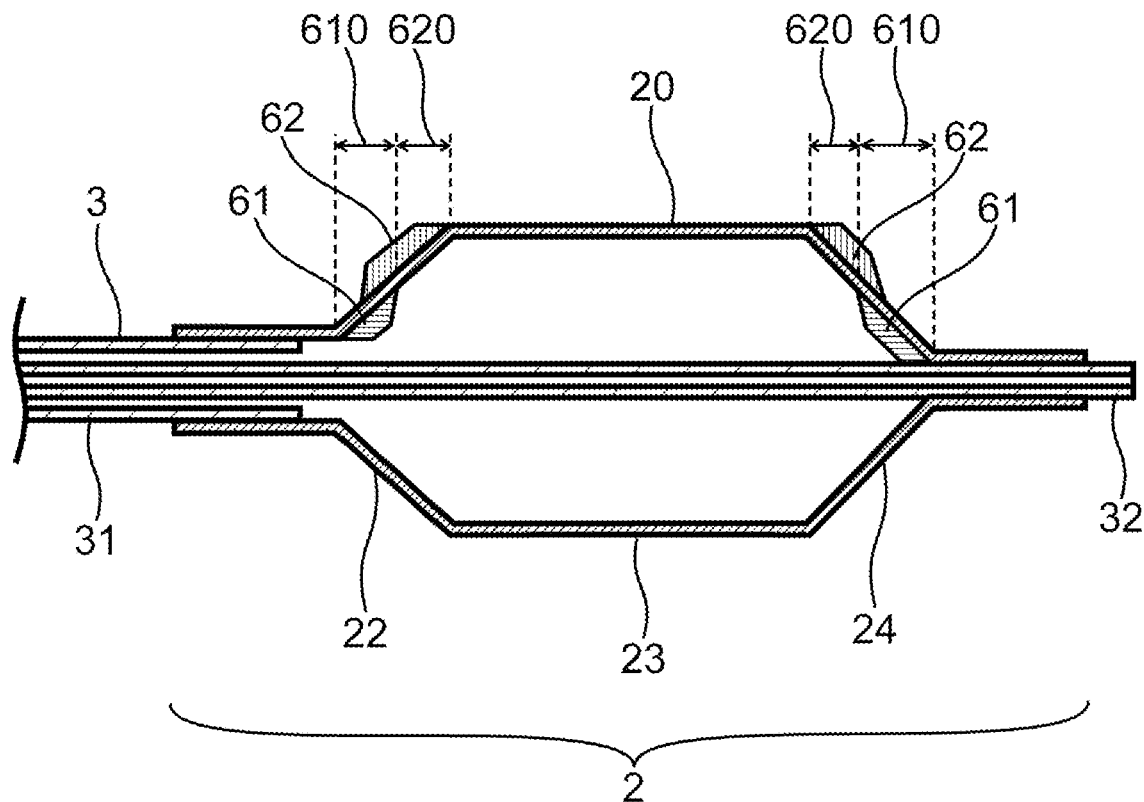

[FIG. 3]
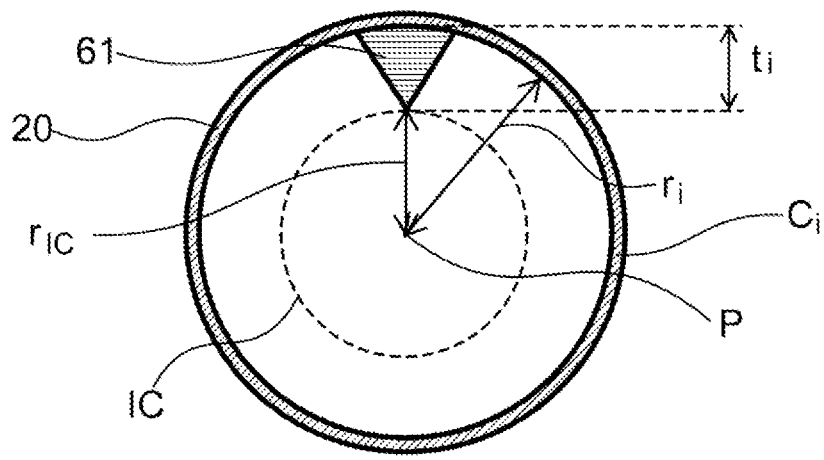
[FIG. 4]
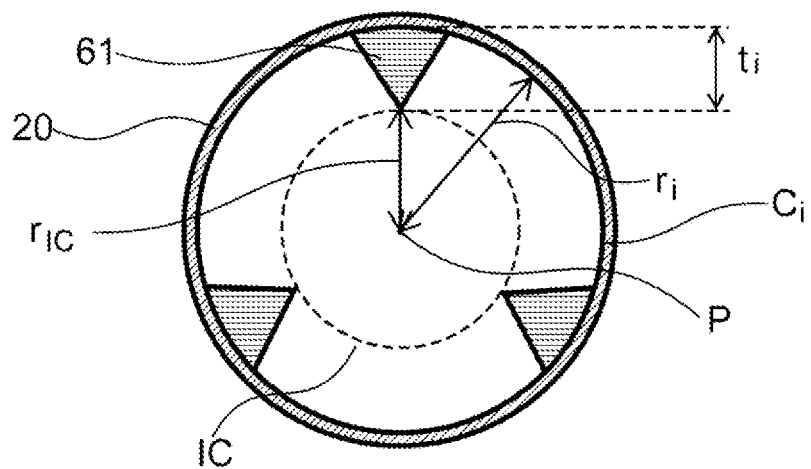

[FIG. 5]
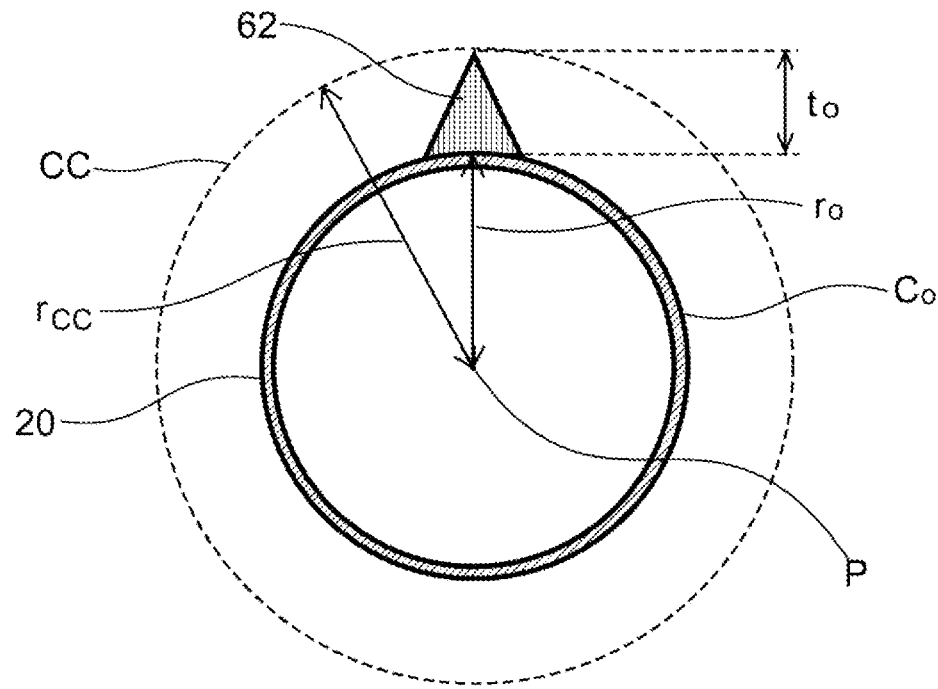
[FIG. 6]
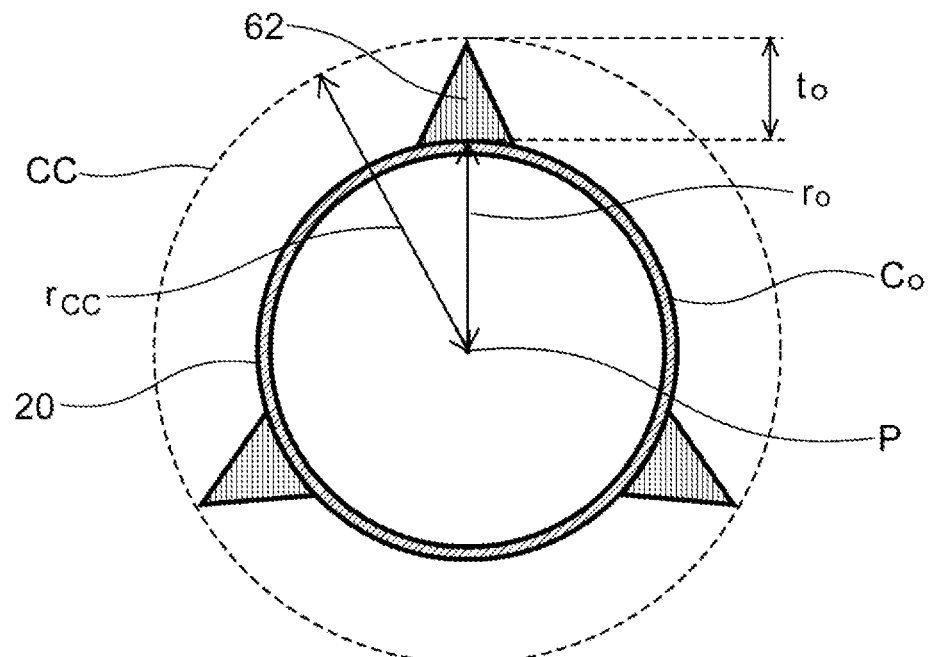

[FIG. 7]
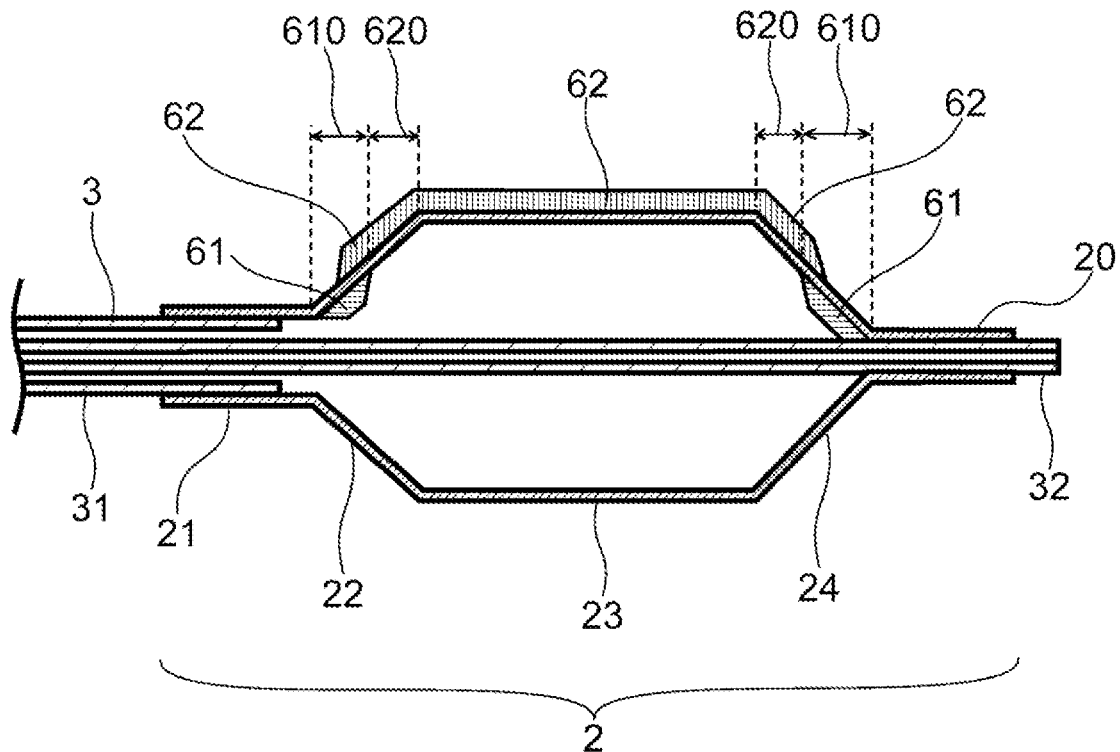
[FIG. 8]
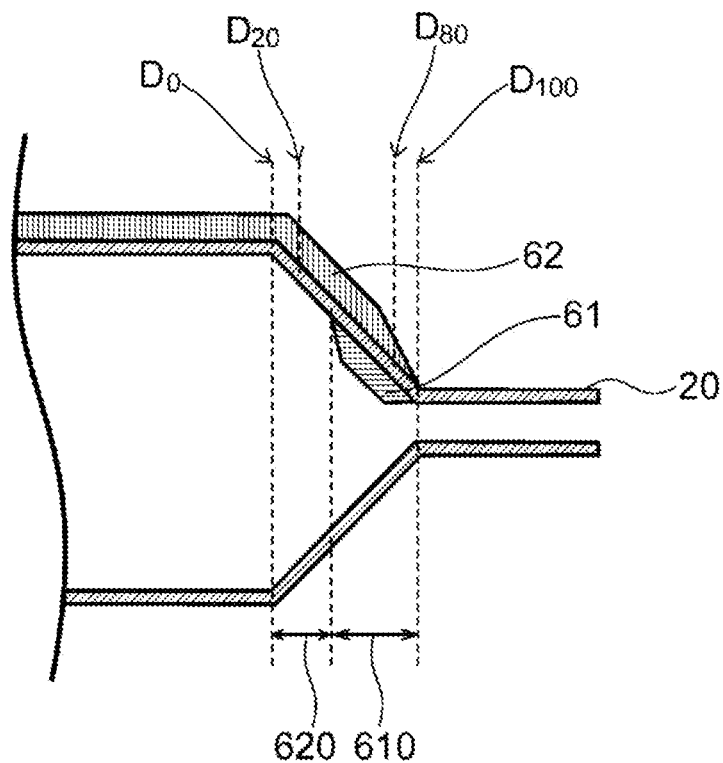

[FIG. 9]
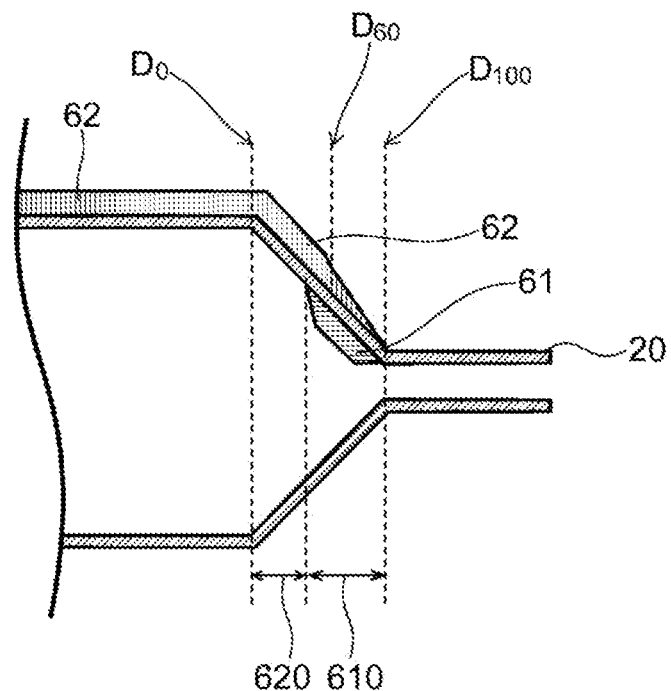
[FIG. 10]
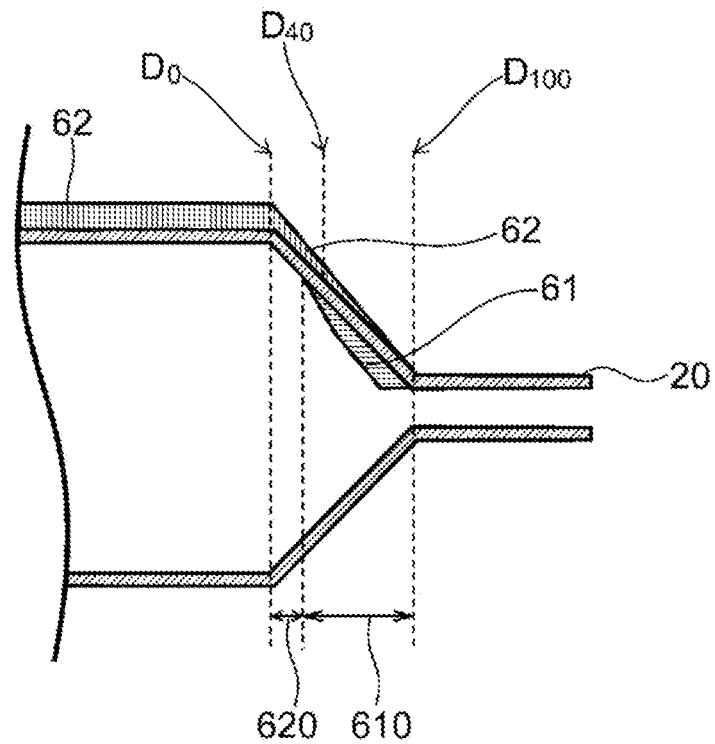

[FIG. 11]
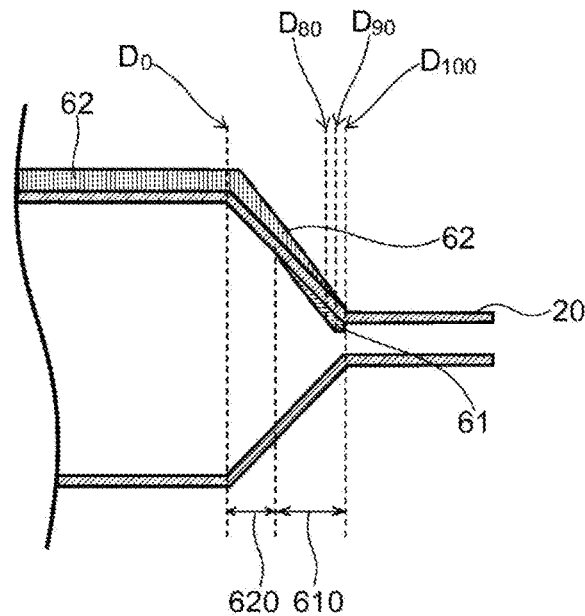
[FIG. 12]
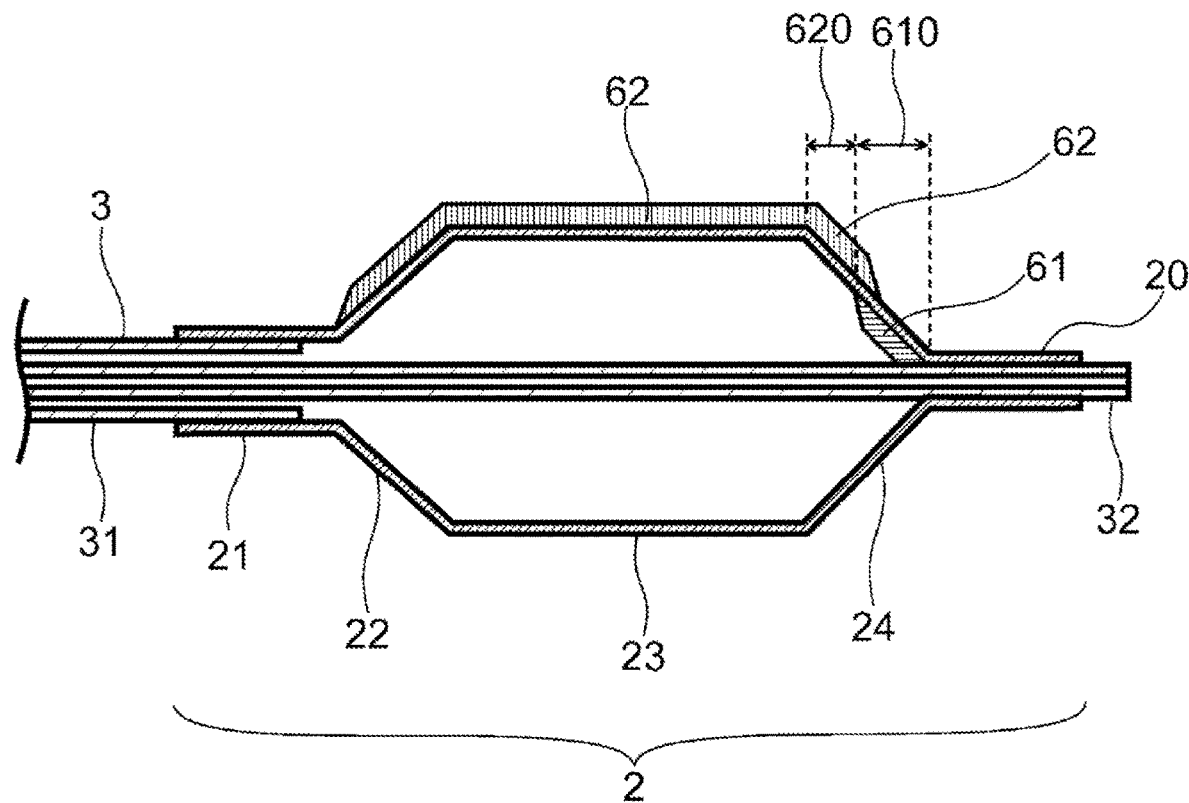

[FIG. 13]
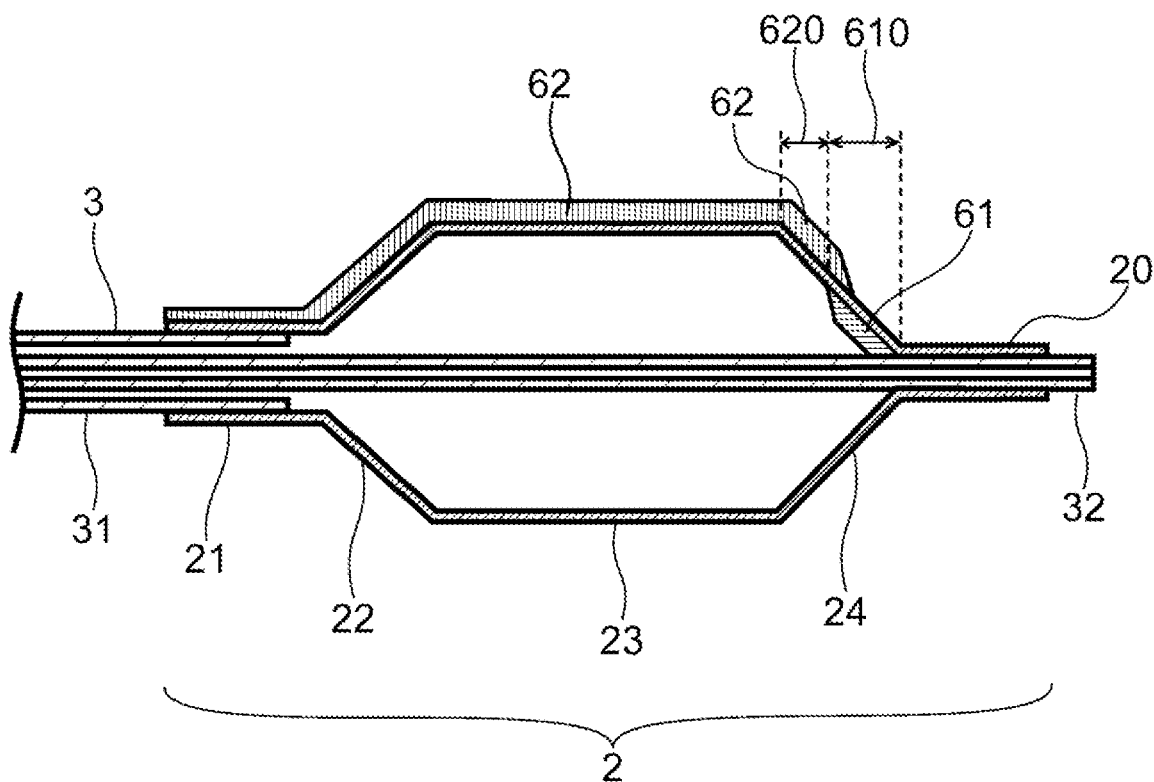
[FIG. 14]
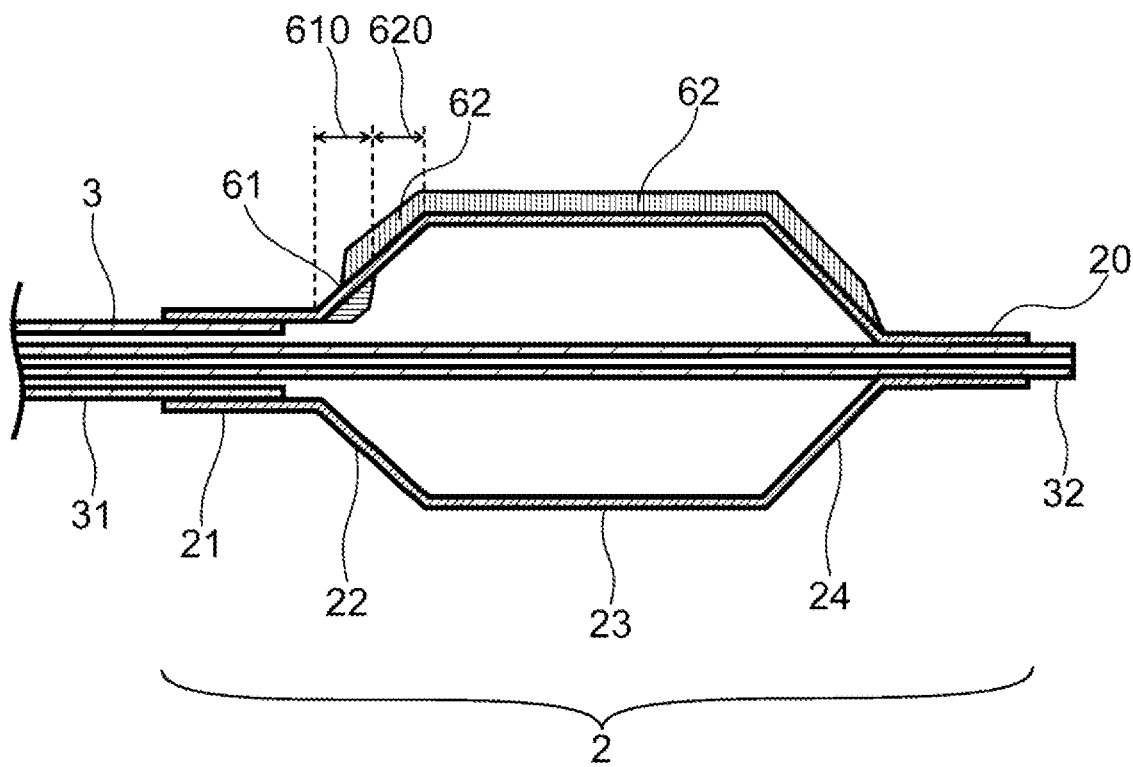

[FIG. 15]
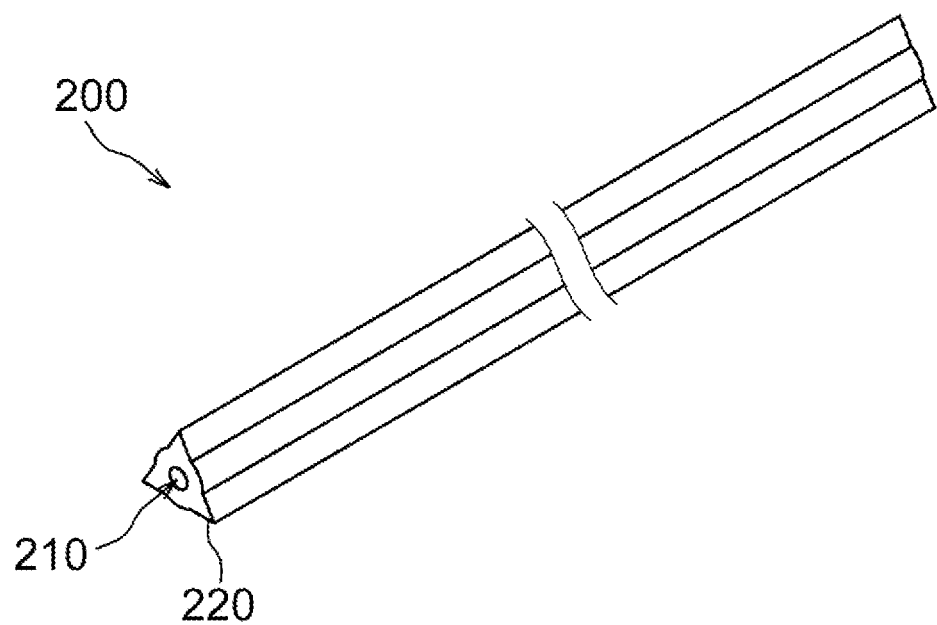

BALLOON FOR BALLOON CATHETER

TECHNICAL FIELD

The present invention relates to a balloon catheter for a balloon catheter.

BACKGROUND ART

Diseases such as angina pectoris and myocardial infarction are caused by the formation of stenotic areas hardened by calcification and other factors in the inner walls of blood vessels. One of treatments for these diseases is angioplasty, in which a balloon catheter is used to dilate the stenotic area. Angioplasty is a minimally invasive therapy that does not require an open chest procedure like bypass surgery, and is widely used.

In angioplasty, it is sometimes difficult to dilate a stenosis that has hardened due to calcification and other factors with a standard balloon catheter. In some cases, while the method of dilating a stenosis by implanting an indwelling expansion device called a stent into the stenosis is also used, an ISR (In-Stent-Restenosis) lesion, for example, may occur after this treatment, in which the neointima of the vessel grows excessively and the vessel becomes stenotic again. The neointima in ISR lesions is soft and the surface is slippery, so a standard balloon catheter may cause the balloon to shift out of the lesion site during balloon dilation to damage the vessel.

Balloon catheters that can dilate a stenosis even in such calcified or ISR lesions include balloon catheters with a protrusion, blade, or scoring element on the balloon to bite into the stenosis. For example, Patent Document 1 discloses a balloon catheter having a scoring element that is composed of a polymeric material stiffer than the polymeric material forming the balloon body, and that is flattened at one end and the other end of the balloon. Patent Document 2 discloses a scoring balloon structure in which the height of the scoring element decreases along the tapered shape of the balloon, and Patent document 3 discloses a balloon catheter in which protrusion located in the distal tapered part is higher than in the straight tubular part of the balloon. Patent Document 4 discloses a balloon catheter in which the straight tubular part of the balloon has an outer protruding portion and the tapered part has an inner protruding portion.

RELATED ART DOCUMENT

Patent Document

Patent Document 1: US 2016/0128718
Patent Document 2: JP 2014-506140 T
Patent Document 3: WO 2020/012850
Patent Document 4: WO 2020/012851

SUMMARY OF THE INVENTION

Problems to be Solved by the Invention

A balloon catheter is inserted into a body cavity in a deflated and folded state and delivered to the treatment site. For safe and appropriate treatment, the balloon is required to be easily folded, inserted into the body cavity, and delivered to the treatment site within the body cavity. However, conventional balloon catheters, as described above, have room for improvement in terms of ease of balloon folding and insertion into and through the body cavity, as well as in terms of preventing the balloon from elongating in the longitudinal axis direction of the balloon to prevent the balloon from expanding into and damaging normal blood vessels that are not the target of treatment and to expand the balloon sufficiently in the radial direction to increase treatment sufficiency. Therefore, the objective of the present invention is to provide a balloon for a balloon catheter that can be easily folded to facilitate insertion into and through a body cavity and prevent elongation of the balloon in the longitudinal axis direction.

Means for Solving the Problems

A balloon for a balloon catheter in one embodiment of the present invention that can solve the above problems has a balloon body having an outer surface and an inner surface, wherein the balloon body has a straight tubular part, a distal tapered part located distal to the straight tubular part, and a proximal tapered part located proximal to the straight tubular part, and the balloon satisfies at least one of the following (1) and (2):

(1) in a longitudinal axis direction of the balloon body, the distal tapered part has a first part having an inner protrusion part that projects radially inwardly from an inner surface of the balloon body and extends in the longitudinal axis direction of the balloon body, and a second part that is the entire section excluding the first part and does not have the inner protrusion part; and the distal tapered part has an outer protrusion part that projects radially outwardly from an outer surface of the balloon body and extends in the longitudinal axis direction of the balloon body in the entire extent of the second part, and (2) in a longitudinal axis direction of the balloon body, the proximal tapered part has a first part having an inner protrusion part that projects radially inwardly from an inner surface of the balloon body and extends in the longitudinal axis direction of the balloon body, and a second part that is the entire section excluding the first part and does not have the inner protrusion part; and the proximal tapered part has an outer protrusion part that projects radially outwardly from an outer surface of the balloon body and extends in the longitudinal axis direction of the balloon body in the entire extent of the second part.

Preferably, in the above balloon for a balloon catheter, the outer protrusion part and the inner protrusion part are arranged in the same circumferential position of the balloon body.

Preferably, in the above balloon for a balloon catheter, the first part is not provided on a side nearer the straight tubular part than the second part.

Preferably, in the above balloon for a balloon catheter, ends of the distal tapered part and the proximal tapered part on the straight tubular part side are termed as a position of 0% and the other ends of the distal tapered part and the proximal tapered part are termed as a position of 100% in the longitudinal axis direction of the balloon body, and the second part is provided over a section at least from the position of 0% to a position of 10% of at least one of the distal tapered part and the proximal tapered part.

Preferably, the above balloon for a balloon catheter has the outer protrusion part in the entire extent of the first part.

Preferably, in the above balloon for a balloon catheter, the straight tubular part has the outer protrusion part. In this case, the balloon preferably satisfies at least one of the following (1) and (2):

(1) the outer protrusion part of the distal tapered part and the outer protrusion part of the straight tubular part extend continuously in the longitudinal axis direction of the balloon body, and (2) the outer protrusion part of the proximal tapered part and the outer protrusion part of the straight tubular part extend continuously in the longitudinal axis direction of the balloon body.

Preferably, in the above balloon for a balloon catheter, ends of the distal tapered part and the proximal tapered part on the straight tubular part side are termed as a position of 0% and the other ends of the distal tapered part and the proximal tapered part are termed as a position of 100% in the longitudinal axis direction of the balloon body, the outer protrusion part is provided in a section at least from a position of 20% to a position of 80% of at least one of the distal tapered part and the proximal tapered part, and the balloon satisfies at least one of the following (1) and (2) when a difference between a radius of an outer circle whose radius is an outer diameter of the balloon body and a radius of a circumscribed circle of the outer protrusion part sharing a center with the outer circle in a radial direction of the balloon body is defined as a height of the outer protrusion part:

(1) the height of the outer protrusion part at the position of 80% of the distal tapered part is the same as or lower than the height of the outer protrusion part at the position of 20% of the distal tapered part, and (2) the height of the outer protrusion part at the position of 80% of the proximal tapered part is the same as or lower than the height of the outer protrusion part at the position of 20% of the proximal tapered part.

Preferably, in the above balloon for a balloon catheter, ends of the distal tapered part and the proximal tapered part on the straight tubular part side are termed as a position of 0% and the other ends of the distal tapered part and the proximal tapered part are termed as a position of 100% in the longitudinal axis direction of the balloon body, and the outer protrusion part is provided at least at a position of 60% of at least one of the distal tapered part and the proximal tapered part; and when a difference between a radius of an outer circle whose radius is an outer diameter of the balloon body and a radius of a circumscribed circle of the outer protrusion part sharing a center with the outer circle in a radial direction of the balloon body is defined as a height of the outer protrusion part, the height of the outer protrusion part at the position of 60% is the same as or lower than the height of the outer protrusion part in the straight tubular part.

Preferably, in the above balloon for a balloon catheter, ends of the distal tapered part and the proximal tapered part on the straight tubular part side are termed as a position of 0% and the other ends of the distal tapered part and the proximal tapered part are termed as a position of 100% in the longitudinal axis direction of the balloon body, and the outer protrusion part is provided at least at a position of 40% of at least one of the distal tapered part and the proximal tapered part; and when a difference between a radius of an outer circle whose radius is an outer diameter of the balloon body and a radius of a circumscribed circle of the outer protrusion part sharing a center with the outer circle in a radial direction of the balloon body is defined as a height of the outer protrusion part, the height of the outer protrusion part at the position of 40% is the same as or lower than the height of the outer protrusion part in the straight tubular part.

Preferably, in the above balloon for a balloon catheter, ends of the distal tapered part and the proximal tapered part on the straight tubular part side are termed as a position of 0% and the other ends of the distal tapered part and the proximal tapered part are termed as a position of 100% in the longitudinal axis direction of the balloon body, and the first part is provided in a section at least from a position of 80% to the position of 100% of at least one of the distal tapered part and the proximal tapered part; and when a difference between a radius of an inner circle whose radius is an inner diameter of the balloon body and a radius of an inscribed circle of the inner protrusion part sharing a center with the inner circle in a radial direction of the balloon body is defined as a height of the inner protrusion part, the balloon satisfies at least one of the following (1) and (2):

(1) the height of the inner protrusion part at a position of 90% of the distal tapered part is the same as or higher than the height of the inner protrusion part at the position of 80% of the distal tapered part, and (2) the height of the inner protrusion part at a position of 90% of the proximal tapered part is the same as or higher than the height of the inner protrusion part at the position of 80% of the proximal tapered part.

Preferably, in the above balloon for a balloon catheter, the distal tapered part has the first part and the second part, and the proximal tapered part does not have the inner protrusion part. In this case, the balloon body preferably has a proximal sleeve part located proximal to the proximal tapered part, and the proximal sleeve part and the proximal tapered part have the outer protrusion part and do not have the inner protrusion part. Furthermore, in this case, the outer protrusion part of the proximal sleeve part and the outer protrusion part of the proximal tapered part preferably extend continuously in the longitudinal axis direction of the balloon body. Furthermore, in this case, the straight tubular part preferably has the outer protrusion part, and the protrusion part of the proximal tapered part and the protrusion part of the straight tubular part extend continuously in the longitudinal axis direction of the balloon body.

Preferably, in the above balloon for a balloon catheter, the proximal tapered part has the first part and the second part, and the distal tapered part does not have the inner protrusion part.

Preferably, in the above balloon for a balloon catheter, the outer protrusion part and the inner protrusion part are composed of the same material as the balloon body.

Effects of the Invention

The above balloon for a balloon catheter can be easily folded when deflated and the outer diameter of the balloon can be kept small, which facilitate insertion into a body cavity and improves the followability when being inserted into a body cavity. This allows the time required for treatment using the balloon catheter to be shortened, thereby reducing the burden on the patient. Furthermore, the above balloon for a balloon catheter can prevent elongation of the balloon in the longitudinal axis direction, such as when inflating the balloon by introducing a fluid such as pressurized fluid into the balloon. The ability to prevent elongation of the balloon in the longitudinal axis direction makes it possible to dilate a stenotic area without causing damage by inflating the balloon into a normal blood vessel that is not the target of treatment.

BRIEF DESCRIPTION OF THE DRAWINGS

FIG. 1 is a side view of a balloon catheter in accordance with one embodiment of the present invention.

FIG. 2 is a cross-sectional view of a distal part of the balloon catheter shown in FIG. 1 in the longitudinal axis direction.

FIG. 3 is a III-III cross-sectional view of FIG. 1.

FIG. 4 is a cross-sectional view representing a variation of FIG. 3.

FIG. 5 is a V-V cross-sectional view of FIG. 1.

FIG. 6 is a cross-sectional view representing a variation of FIG. 5.

FIG. 7 is a cross-sectional view of a distal part of a balloon catheter in accordance with another embodiment of the present invention in the longitudinal axis direction.

FIG. 8 is a partially enlarged view of a cross section of a balloon in accordance with one embodiment of the present invention in the longitudinal axis direction.

FIG. 9 is a partially enlarged view of a cross section of a balloon in accordance with another embodiment of the present invention in the longitudinal axis direction.

FIG. 10 is a partially enlarged view of a cross section of a balloon in accordance with still another embodiment of the present invention in the longitudinal axis direction.

FIG. 11 is a partially enlarged view of a cross section of a balloon in accordance with still another embodiment of the present invention in the longitudinal axis direction.

FIG. 12 is a cross-sectional view of a distal part of a balloon catheter in accordance with still another embodiment of the present invention in the longitudinal axis direction.

FIG. 13 is a cross-sectional view of a distal part of a balloon catheter in accordance with still another embodiment of the present invention in the longitudinal axis direction.

FIG. 14 is a cross-sectional view of a distal part of a balloon catheter in accordance with still another embodiment of the present invention in the longitudinal axis direction.

FIG. 15 is a perspective view of a parison before expansion in accordance with one embodiment of the present invention.

MODE FOR CARRYING OUT THE INVENTION

Hereinafter, the present invention will be described based on the following embodiments, however, the present invention is not limited by the following embodiments and can be altered in design within a scope in compliance with the intent described above and below, and all the changes are to be encompassed within a technical scope of the present invention. Note that, in each drawing, hatching, reference signs for components, and the like may be omitted for convenience of description, and in such a case, the specification and other drawings are to be referred to. Furthermore, since the dimensions of the various components in the drawings are provided for the purpose of facilitating the understanding of the feature of the present invention, the dimensions may differ from the actual dimensions in some cases.

One embodiment of a balloon for a balloon catheter of the present invention has a balloon body having an outer surface and an inner surface, wherein the balloon body has a straight tubular part, a distal tapered part located distal to the straight tubular part, and a proximal tapered part located proximal to the straight tubular part, and the balloon satisfies at least one of the following (1) and (2):

(1) in a longitudinal axis direction of the balloon body, the distal tapered part has a first part having an inner protrusion part that projects radially inwardly from an inner surface of the balloon body and extends in the longitudinal axis direction of the balloon body, and a second part that is the entire section excluding the first part and does not have the inner protrusion part; and the distal tapered part has an outer protrusion part that projects radially outwardly from an outer surface of the balloon body and extends in the longitudinal axis direction of the balloon body in the entire extent of the second part, and (2) in a longitudinal axis direction of the balloon body, the proximal tapered part has a first part having an inner protrusion part that projects radially inwardly from an inner surface of the balloon body and extends in the longitudinal axis direction of the balloon body, and a second part that is the entire section excluding the first part and does not have the inner protrusion part; and the proximal tapered part has an outer protrusion part that projects radially outwardly from an outer surface of the balloon body and extends in the longitudinal axis direction of the balloon body in the entire extent of the second part.

Thus, at least one of the distal tapered part and the proximal tapered part has the first part having the inner protrusion part and the second part that is the entire section excluding the first part and does not have the inner protrusion part, which allows the balloon to be easily folded when deflated to reduce the outer diameter of the balloon, making the balloon for a balloon catheter easy to insert into a body cavity and highly trackable when inserted through a body cavity. In addition, the balloon has the inner protrusion part in the first part and the outer protrusion part in the entire extent of the second part that does not has the inner protrusion part, and thus, the balloon body is reinforced by the inner protrusion part and the outer protrusion part, which prevents elongation of the balloon in the longitudinal axis direction when, for example, a fluid such as pressurized fluid is introduced into the balloon to inflate the balloon. Hereinafter, the balloon for a balloon catheter may be referred to simply as the "balloon".

Referring to FIG. 1 to FIG. 11, the balloon for a balloon catheter will be explained. FIG. 1 is a side view of a balloon catheter in one embodiment of the present invention, and FIG. 2 is a cross-section view of a distal part of the balloon catheter shown in FIG. 1 in the longitudinal axis direction. FIG. 3 is a III-III cross-sectional view of FIG. 1, and FIG. 4 is a cross-sectional view representing a variation of FIG. 3. FIG. 5 is a V-V cross-sectional view of FIG. 1, and FIG. 6 is a cross-sectional view representing a variation of FIG. 5. Shafts are omitted in FIG. 3 to FIG. 6. FIG. 7 is a cross-sectional view of a distal part of a balloon for a balloon catheter in another embodiment of the present invention in the longitudinal axis direction. FIG. 8 to FIG. 11 is partially enlarged views of cross section of a distal or proximal part of balloons in different embodiments of the present invention in the longitudinal axis direction. Shafts are omitted in FIG. 8 to FIG. 11.

In the present invention, a proximal side refers to the direction towards a user's or operator's hand in the extending direction of a balloon catheter 1 or the longitudinal axis direction of a shaft 3, and a distal side refers to the opposite side of the proximal side, that is, the direction toward the person to be treated.

As shown in FIG. 1 and FIG. 2, a balloon catheter 1 has a shaft 3 and a balloon 2 disposed outside the shaft 3. The balloon catheter 1 has the proximal side and the distal side, and the balloon 2 is disposed on the distal side of the shaft 3. The balloon catheter 1 is configured such that fluid is introduced in the balloon 2 through the shaft 3, and the inflation and deflation of the balloon 2 can be controlled using an indeflator (pressurizer for balloons). The fluid may be a pressurized fluid pressurized by a pump or the like.

The shaft 3 preferably has a flow path for the fluid inside, and further has a guidewire insertion path. Configurations in which the shaft 3 has an internal fluid path and guidewire insertion path include, for example, a configuration in which the shaft 3 has an outer tube 31 and an inner tube 32, and the inner tube 32 serves as the guidewire insertion path and the space between the inner tube 32 and the outer tube 31 serves as the fluid flow path. In the case where the shaft 3 has the outer tube 31 and the inner tube 32, preferably, the inner tube 32 extends through the distal end of the outer tube 31 and penetrates the balloon 2 to the distal side, the distal side of the balloon 2 is fixed to the inner tube 32, and the proximal side of the balloon 2 is fixed to the outer tube 31.

As shown in FIGS. 1 to 8, the balloon 2 for the balloon catheter 1 has a balloon body 20 having an outer surface and an inner surface, and the balloon body 20 has a straight tubular part 23, a distal tapered part 24 located distal to the straight tubular part 23, and a proximal tapered part 22 located proximal to the straight tubular part 23, and the balloon 2 satisfies at least one of the following (1) and (2):

(1) in a longitudinal axis direction of the balloon body 20, the distal tapered part 24 has a first part 610 having an inner protrusion part 61 that projects radially inwardly from an inner surface of the balloon body 20 and extends in the longitudinal axis direction of the balloon body 20, and a second part 620 that is the entire section excluding the first part 610 and does not have the inner protrusion part 61; and the distal tapered part 24 has an outer protrusion part 62 that projects radially outwardly from an outer surface of the balloon body 20 and extends in the longitudinal axis direction of the balloon body 20 in the entire extent of the second part 620, and (2) in a longitudinal axis direction of the balloon body 20, the proximal tapered part 22 has a first part 610 having an inner protrusion part 61 that projects radially inwardly from an inner surface of the balloon body 20 and extends in the longitudinal axis direction of the balloon body 20, and a second part 620 that is the entire section excluding the first part 610 and does not have the inner protrusion part 61; and the proximal tapered part 22 has an outer protrusion part 62 that projects radially outwardly from an outer surface of the balloon body 20 and extends in the longitudinal axis direction of the balloon body 20 in the entire extent of the second part 620.

At least one of the distal tapered part 24 and the proximal tapered part 22 has the second part 620 that does not have the inner protrusion part 61 inside, which hinders the balloon 2 from being folded, allowing the balloon 2 to be easily folded when deflated and reduce the outer diameter of the balloon 2. In addition, at least one of the distal tapered part 24 and the proximal tapered part 22 having the outer protrusion part 62 in the entire extent of the second part 620 that does not have the inner protrusion part 61 can ensure the stiffness of the balloon 2 and prevent the balloon 2 from elongating in the longitudinal axis direction when, for example, introducing fluid such as pressurized fluid in the balloon 2 to inflate the balloon 2. This allows easy dilation of the stenotic area and can reduce the risk that the balloon 2 expands into and damages normal blood vessels that are not the target of treatment.

While FIG. 2 shows an example in which both the distal tapered part 24 and the proximal tapered part 22 have the first part 610 (the part having the inner protrusion part 61) and the second part 620 (the part not having the inner protrusion part 61 and having the outer protrusion part 62 in the entire extent of the part), only the distal tapered part 24, or only the proximal tapered part 22 may have the first part 610 and the second part 620. In this case, the tapered part without the first part 610 and the second part 620 may have the outer protrusion part 62, and may have the inner protrusion part 61 in the entire extent of the part.

The distal tapered part 24 and the proximal tapered part 22 are preferably formed so that the diameter decreases as it is away from the straight tubular part 23. The balloon 2 having the straight tubular part 23 having the largest diameter in the inflated state allows the straight tubular part 23 to make sufficient contact with the stenosis to facilitate dilation of the stenosis, and the balloon 2 having the distal tapered part 24 and the proximal tapered part 22 whose outer diameter decreases at it is away from the straight tubular part 23 allows the balloon 2 to be easily inserted into a body cavity because the outer diameters of the distal and proximal sides of the balloon 2 are reduced to decrease the step between the shaft 3 and the balloon 2 when the balloon 2 is deflated and wrapped around the shaft 3.

As shown in FIG. 3, at least one of the distal tapered part 24 and the proximal tapered part 22 may have one inner protrusion part 61 in the circumferential direction in the first part 610, or as shown FIG. 4, may have a plurality of the inner protrusion parts 61 in the circumferential direction. In the case of having a plurality of the inner protrusion parts 61, each of the inner protrusion parts 61 is preferably spaced apart from each other in the circumferential direction, and more preferably equally spaced in the circumferential direction. At least one of the distal tapered part 24 and the proximal tapered part 22 having a plurality of the inner protrusion parts 61 in such a way can prevent elongation in the longitudinal axis direction of the balloon 2 evenly in the circumferential direction.

As shown in FIG. 5, at least one of the distal tapered part 24 and the proximal tapered part 22 may have one outer protrusion part 62 in the circumferential direction in the second part 620, or as shown in FIG. 6, may have a plurality of the outer protrusion parts 62 in the circumferential direction. In the case of having a plurality of the outer protrusion parts 62 in the circumferential direction, each of the outer protrusion parts 62 preferably spaced apart from each other in the circumferential direction, and more preferably equally spaced in the circumferential direction. The configuration in which at least one of the distal tapered part 24 and the proximal tapered part 22 has the outer protrusion part 62 in such a way can prevent elongation in the longitudinal axis direction of the balloon 2 evenly in the circumferential direction. In addition, since the balloon 2 can be secured to the stenosis and incise the stenosis by the outer protrusion part 62, the outer protrusion parts 62 spaced apart from each other, preferably equally spaced apart from each other can facilitate securing the balloon 2 and incising the stenosis.

The cross-sectional shape of the inner protrusion part 61 and the outer protrusion part 62 perpendicular to the longitudinal axis direction may be any shape, and may be approximate triangle as shown in FIG. 3 to FIG. 6, or polygon, fan shape, wedge shape, convex shape, spindle shape, or the like. As for the height of the inner protrusion part 61 and the outer protrusion part 62, each the maximum value in the first part 610 and the second part 620 is preferably 1 time or more the film thickness of the balloon body 20, more preferably 1.5 times or more, and even more preferably 2 times or more, and is acceptable to be 50 times or less, 30 times or less, or 10 times or less. The maximum values of the height of the inner protrusion part 61 and the outer protrusion part 62 in the first part 610 and the second part 62, respectively, within the above range can prevent elongation of the balloon 2 in the longitudinal axis direction. The definition of the height of the inner protrusion part 61 and the outer protrusion part 62 will be described later.

As shown in FIG. 2, the outer protrusion part 62 and the inner protrusion part 61 are preferably arranged in the same circumferential position of the balloon body 20. This allows the balloon 2 to more easily prevent elongation of the balloon 2 in the longitudinal axis direction because the balloon 2 has the outer protrusion part 62 that can reinforce the balloon body 20 from the outside and the inner protrusion part 61 that can reinforce the balloon body from the inside at the same circumferential position of the balloon body 20.

When ends of the distal tapered part 24 and the proximal tapered part 22 on the straight tubular part 23 side are termed as a position of 0% $D_0$ and the other ends are termed as a position of 100% $D_{100}$ in the longitudinal axis direction of the balloon body 20, the first part 610 may be provided in the section, for example, from the position of 90% to the position of 100%. The first part 610 provided at least in the above section can prevent elongation of the balloon 2 in the longitudinal axis direction. The section in which the first part 610 is provided may be, for example, from the position of 80% to the position of 100%, from the position of 70% to the position of 100%, from the position of 60% to the position of 100%, from the position of 50% to the position of 100%, from the position of 40% to the position of 100%, from the position of 30% to the position of 100%, from the position of 20% to the position of 100%, or from the position of 10% to the position of 100%. The first part 610 provided in the section in the above range can prevent elongation in the longitudinal axis direction, and allows the balloon 2 to be easily folded because the entire section excluding the first section 610 is the second part 620, which is without the inner protrusion part 61.

As shown in FIG. 2, preferably, the first part 610 is not provided on a side nearer the straight tubular part 23 than the second part 620. In other words, a portion adjacent to the straight tubular part 23 of at least one of the distal tapered part 24 and the proximal tapered part preferably has the second part 620, which is without the inner protrusion part 61. The absence of the inner protrusion part 61 on the inside of the tapered part adjacent to the straight tubular part 23 side, where the folding allowance is larger, allows the balloon 2 to be folded more easily.

When ends of the distal tapered part 24 and the proximal tapered part 22 on the straight tubular part 23 side are termed as a position of 0% $D_0$ and the other ends are termed as a position of 100% $D_{100}$ in the longitudinal axis direction of the balloon body 20, the second part 620 is preferably provided over a section at least from the position of 0% to the position of 10% of at least one of the distal tapered part 24 and the proximal tapered part 22. In other words, the inner protrusion part 61 is preferably not provided in the section from the position of 0% to the position of 10% of at least one of the distal tapered part 24 and the proximal tapered part 22. More preferably, the second part 620 is provided over a section from the position of 0% to the position of 15%, and even more preferably, from the position of 0% to the position of 20%. The second part 620 may be provided from the position of 0% to the position of 90%, or from the position of 0% to the position of 80%. The second part 620 is provided over a section at least from the position of 0% to the position of 10%, that is, there is no inner protrusion part 61 in the section at least from the position of 0% to the position of 10%, which allows the balloon 2 to be easily folded.

The balloon 2 preferably has the outer protrusion part 62 in the entire extent of the first part 610. Since the balloon 2 has the outer protrusion part 62 in the second part 620, which is the entire section excluding the first part 610, when the balloon 2 has the outer protrusion part 62 in the entire extent of the first part 610, it can be configured to have the outer protrusion 62 in the entire section of at least one of the distal tapered part 24 and the proximal tapered part 22 that has the first part 610 and the second part 620. This configuration can further reduce the elongation of the balloon 2 in the longitudinal axis direction.

In this case, the height of the outer protrusion part 62 provided in the first part 610 is preferably lower on the other end side of the first part 610 than on the end side of the straight tubular part 23. In this configuration, the outer diameter of the balloon 2 can be reduced because the height of the outer protrusion part 62 is lower on the side of the balloon 2 with more reduced diameter, which can facilitate insertion into a body cavity and improve the followability of the balloon 2 when being inserted through the body cavity. Even if the height of the outer protrusion part 62 is low in the portion of the first part 610 including the opposite end to the straight tubular part 23, the first part 610 having the inner protrusion part 61 can ensure the stiffness of the tapered part and prevent elongation of the balloon 2 in the longitudinal axis direction.

Alternatively, the balloon 2 may have the outer protrusion part 62 at a part of the first part 610. In this case, preferably, the balloon 2 has the outer protrusion part 62 in a section of the first part 610 including the end on the straight tubular part 23 side in the longitudinal axis direction of the balloon body 20, and does not have the outer protrusion part 62 in a section including the other end. In this configuration, the outer diameter of the balloon 2 can be reduced because the outer protrusion part 62 is not provided on the side of the balloon 2 with more reduced diameter, which can facilitate insertion into a body cavity and improve the followability of the balloon 2 when being inserted through the body cavity. Even if the outer protrusion part 62 is not provided in the portion of the first part 610 including the opposite end to the straight tubular part 23, the balloon 2 having the inner protrusion part 61 in the first part 610 can ensure the stiffness of the tapered part and prevent elongation of the balloon 2 in the longitudinal axis direction.

In addition, in this case, the height of the outer protrusion part 62 provided in the first part 610 is preferably higher toward the straight tubular part 23 side of the first part 610. This allows the outer diameter of the balloon 2 to be reduced because the height of the outer protrusion part 62 is lower on the side of the balloon 2 with more reduced diameter, thereby facilitating insertion into a body cavity and improving followability of the balloon when inserted through the body cavity.

As shown in FIG. 7, the straight tubular part 23 preferably has the outer protrusion part 62. Thanks to this configuration, where the straight tubular part 23, which has the largest diameter in the inflated state of the balloon 2, has the outer protrusion part 62, the outer protrusion part 62 at the straight tubular part 23 can facilitate fixation of the balloon 2 and incision of the stenosis.

As shown in FIG. 7, the balloon 2 preferably satisfies at least one of the following (1) and (2):
(1) the outer protrusion part 62 of the distal tapered part 24 and the outer protrusion part 62 of the straight tubular part 23 extend continuously in the longitudinal axis direction of the balloon body 20, and
(2) the outer protrusion part 62 of the proximal tapered part 22 and the outer protrusion part 62 of the straight tubular part 23 extend continuously in the longitudinal axis direction of the balloon body 20.

FIG. 7 shows an example in which the outer protrusion part 62 of the distal tapered part 24, the outer protrusion part 62 of the straight tubular part 23, and the outer protrusion part 62 of the proximal tapered part 22 extend continuously in the longitudinal axis direction, that is, both the above (1) and (2) are satisfied, but at least one of the above (1) and (2) may be satisfied. At least one of the distal tapered part 24 and the proximal tapered part 22 having the outer protrusion part 62 that extends continuously in the longitudinal axis direction of the balloon body 20 with the outer protrusion part 62 of the straight tubular part 23 can further reduce elongation of the balloon 2 in the longitudinal axis direction.

As shown in FIG. 8, when ends of the distal tapered part 24 and the proximal tapered part 22 on the straight tubular part 23 side are termed as a position of 0% $D_0$ and the other ends are termed as a position of 100% $D_{100}$ in the longitudinal axis direction of the balloon body 20, the outer protrusion part 62 is preferably provided in a section at least from the position of 20% $D_{20}$ to the position of 80% $D_{80}$ of at least one of the distal tapered part 24 and the proximal tapered part 22, and at least one of the following (1) and (2) is satisfied when the difference between the radius $r_o$ of the outer circle $C_o$ whose radius is the outer diameter of the balloon body 20 and the radius $r_{CC}$ of the circumscribed circle CC of the outer protrusion part 62 sharing the center P with the outer circle $C_o$ in the radial direction of the balloon body 20 is defined as the height $t_o$ of the outer protrusion part 62:
(1) the height of the outer protrusion part 62 at the position of 80% of the distal tapered part 24 is the same as or lower than the height of the outer protrusion part 62 at the position of 20% of the distal tapered part 24, and
(2) the height of the outer protrusion part 62 at the position of 80% of the proximal tapered part 22 is the same as or lower than the height of the outer protrusion part 62 at the position of 20% of the proximal tapered part 22.

In the case where at least one of the distal tapered part 24 and the proximal tapered part 22 has a plurality of the outer protrusion parts 62 in the circumferential direction, the height of all the outer protrusion parts 62 at the position of 80% $D_{80}$ is preferably the same as or lower than the height at the position of 20% $D_{20}$. By having the outer protrusion part 62 that meets the above requirements, the height of the outer protrusion part 62 on the side of the balloon 2 having more reduced diameter can be lowered to decrease the outer diameter of the balloon 2, facilitating insertion into a body cavity and improving followability of the balloon when being inserted through the body cavity. Even if the height of the outer protrusion part 62 at the position of 80% $D_{80}$ is lowered, the balloon 2 in accordance with embodiments of the present invention having the inner protrusion part 61 in the first part 610 can ensure stiffness of the tapered part and prevent elongation of the balloon 2 in the longitudinal axis direction.

The measurement method for the height of the outer protrusion part 62 is explained referring to FIGS. 5 and 6. The method includes, after introducing 5 atmospheres of UV-curable resin into the balloon 2 to inflate it, curing the UV-curable resin by irradiating it with UV, and cutting the balloon body 20 at the desired position in the longitudinal axis direction of the balloon body 20, for example, at the position of 20% $D_{20}$ and at the position of 80% $D_{80}$ in the above case, in the radial direction perpendicular to the longitudinal axis direction. The cut surface is observed using a microscope such as an optical microscope to determine the radius $r_o$ of the outer circle $C_o$ whose radius is the outer diameter of the balloon body 20 and the radius $r_{CC}$ of the circumscribed circle CC of the outer protrusion part 62 that shares the center P with the outer circle $C_o$ in the radial direction of the balloon body 20, and the height $t_o$ of the outer protrusion part 62 is obtained by subtracting the radius $r_o$ of the outer circle $C_o$ whose radius is the outer diameter of the balloon body 20 from the radius $r_{CC}$ of the circumscribed circle CC. Any resin can be used as the UV-curable resin, as long as it can be introduced into the balloon 2 to inflate it.

As shown FIG. 9, when ends of the distal tapered part 24 and the proximal tapered part 22 on the straight tubular part 23 side are termed as a position of 0% $D_0$ and the other ends are termed as a position of 100% $D_{100}$ in the longitudinal axis direction of the balloon body 20, the outer protrusion part 62 is preferably provided at least at the position of 60% $D_{60}$ of at least one of the distal tapered part 24 and the proximal tapered part 22, and the height of the outer protrusion part 62 at the position of 60% $D_{60}$ is the same as or lower than the height of the outer protrusion part 62 in the straight tubular part 23 when the difference between the radius $r_o$ of the outer circle $C_o$ whose radius is the outer diameter of the balloon body 20 and the radius $r_{CC}$ of the circumscribed circle CC of the outer protrusion part 62 sharing the center P with the outer circle $C_o$ in the radial direction of the balloon body 20 is defined as the height $t_o$ of the outer protrusion part 62. In the case where at least one of the distal tapered part 24 and the proximal tapered part 22 has a plurality of the outer protrusion parts 62 in the circumferential direction, the height of all the outer protrusion parts 62 at the position of 60% $D_{60}$ is preferably the same as or lower than the height of the outer protrusion part 62 in the straight tubular part 23. By having the outer protrusion part 62 that meets the above requirements, the height of the outer protrusion part 62 on the side having a smaller diameter than at the midpoint of the tapered part in the longitudinal axis direction can be lowered $t_o$ decrease the outer diameter of the balloon 2, facilitating insertion into a body cavity and improving followability of the balloon when being inserted through the body cavity. The outer protrusion part 62 in the portion of the tapered part closer to the straight tubular part 23 can be as high as or higher than the outer protrusion part 62 in the straight tubular part 23, so that the outer protrusion part 62 in the tapered part can be used to fix the balloon to the lesion or incise a stenosis. Even if the height of the outer protrusion part 62 at the position of 60% $D_{60}$ is lowered, the balloon 2 in accordance with embodiments of the present invention having the inner protrusion part 61 in the first part 610 can ensure stiffness of the tapered part and prevent elongation of the balloon 2 in the longitudinal axis direction.

As shown in FIG. 10, when ends of the distal tapered part 24 and the proximal tapered part 22 on the straight tubular part 23 side are termed as a position of 0% $D_0$ and the other ends are termed as a position of 100% $D_{100}$ in the longitudinal axis direction of the balloon body 20, the outer protrusion part 62 is preferably provided at least at the position of 40% $D_{40}$ of at least one of the distal tapered part 24 and the proximal tapered part 22, and the height of the outer protrusion part 62 at the position of 40% $D_{40}$ is the same as or lower than the height of the outer protrusion part 62 in the straight tubular part 23 when the difference between the radius $r_o$ of the outer circle $C_o$ whose radius is the outer diameter of the balloon body 20 and the radius $r_{CC}$ of the circumscribed circle CC of the outer protrusion part 62 sharing the center P with the outer circle $C_o$ in the radial direction of the balloon body 20 is defined as the height $t_o$ of the outer protrusion part 62. In the case where at least one of the distal tapered part 24 and the proximal tapered part 22 has a plurality of the outer protrusion parts 62 in the circumferential direction, the height of all the outer protrusion parts 62 at the position of 40% $D_{40}$ is preferably the same as or lower than the height of the outer protrusion part 62 in the straight tubular part 23. By having the outer protrusion part 62 that meets the above requirements, the height of the outer protrusion part 62 on the side of the tapered part closer to the straight tubular part 23 can be lowered to decrease the outer diameter of the balloon 2, facilitating insertion into a body cavity and improving followability of the balloon when being inserted through the body cavity. Even if the height of the outer protrusion part 62 at the position of 40% $D_{40}$ is lowered, the balloon 2 in accordance with embodiments of the present invention having the inner protrusion part 61 in the first part 610 can ensure stiffness of the tapered part and prevent elongation of the balloon 2 in the longitudinal axis direction.

As shown in FIG. 11, when ends of the distal tapered part 24 and the proximal tapered part 22 on the straight tubular part 23 side are termed as a position of 0% $D_0$ and the other ends are termed as a position of 100% $D_{100}$ in the longitudinal axis direction of the balloon body 20, the first part 610 is preferably provided in the section at least from the position of 80% $D_{80}$ to the position of 100% $D_{100}$ of at least one of the distal tapered part 24 and the proximal tapered part 22, and at least one of the following (1) and (2) is preferably satisfied when the difference between the radius $r_i$ of the inner circle $C_i$ whose radius is the inner diameter of the balloon body 20 and the radius $r_{IC}$ of the circumscribed circle IC of the inner protrusion part 61 sharing the center P with the inner circle $C_i$ in the radial direction of the balloon body 20 is defined as the height $t_i$ of the inner protrusion part 61:

(1) the height of the inner protrusion part 61 at the position of 90% of the distal tapered part 24 is preferably the same as or higher than the height of the inner protrusion part 61 at the position of 80% of the distal tapered part 24, and (2) the height of the inner protrusion part 61 at the position of 90% of the proximal tapered part 22 is preferably the same as or higher than the height of the inner protrusion part 61 at the position of 80% of the proximal tapered part 22.

In the case where at least one of the distal tapered part 24 and the proximal tapered part 22 has a plurality of the inner protrusion parts 61 in the circumferential direction, the height of all the inner protrusion parts 61 at the position of 90% $D_{90}$ is preferably the same as or higher than the height at the position of 80% $D_{80}$. By having the inner protrusion part 61 that meets the above requirements, the height of the inner protrusion part 61 on the side of the tapered part closer to the straight tubular part 23, where the folding allowance is larger, can be lowered, allowing the balloon 2 to be easily folded. In addition, the height of the inner protrusion part 61 at the opposite end to the straight tubular part 23 of the tapered part, in which the diameter is smaller can be made tall, thereby securing the stiffness of the above-mentioned part of the tapered part to prevent elongation of the balloon 2 in the longitudinal axis direction.

The measurement method for the height of the inner protrusion part 61 is explained referring to FIGS. 3 and 4. Similar to the measurement method for the height of the outer protrusion part 62, the method includes, after introducing 5 atmospheres of UV-curable resin into the balloon 2 to inflate it, curing the UV-curable resin by irradiating it with UV, and cutting the balloon body 20 at the desired position in the longitudinal axis direction of the balloon body 20, for example, at the position of 80% $D_{80}$ and at the position of 90% $D_{90}$ in the above case, in the radial direction perpendicular to the longitudinal axis direction. The cut surface is observed using a microscope such as an optical microscope to determine the radius $r_i$ of the inner circle $C_i$ whose radius is the inner diameter of the balloon body 20 and the radius $r_{IC}$ of the inscribed circle IC of the inner protrusion part 61 that shares the center P with the inner circle $C_i$ in the radial direction of the balloon body 20, and the height $t_i$ of the inner protrusion part 61 is obtained by subtracting the radius $r_i$ of the outer circle $C_i$ whose radius is the inner diameter of the balloon body 20 from the radius $r_{IC}$ of the inscribed circle IC. Any resin can be used as the UV-curable resin, as long as it can be introduced into the balloon 2 to inflate it.

The balloon 2 for a balloon catheter in accordance with still other embodiments of the present invention is explained referring to FIGS. 12 and 13. FIGS. 12 and 13 are cross-sectional views in the longitudinal axis direction of a distal part of the balloon catheter 1 in accordance with different embodiments of the present invention.

As shown in FIG. 12, preferably, the distal tapered part 24 has the first part 610 and the second part 620, and the proximal tapered part 22 does not have the inner protrusion part 61. The distal tapered part 24 having the second part 620 that does not have the inner protrusion part 61 inside, which hinders the balloon 2 from being folded, allows the balloon 2 to be easily folded when deflated and can reduce the outer diameter of the balloon 2. The smaller outer diameter of the distal side of the balloon 2 allows the balloon catheter 1 to be easily advanced in a body cavity. In addition, the distal tapered part 24 having the outer protrusion part 62 in the entire extent of the second part 620 that does not have the inner protrusion part 61 can ensure the stiffness of the balloon 2 and prevent the balloon 2 from elongating in the longitudinal axis direction when, for example, introducing fluid such as pressurized fluid in the balloon 2 to inflate the balloon 2. This allows easy dilation of the stenotic area and can reduce the risk that the balloon 2 expands into and damages normal blood vessels that are not the target of treatment. Furthermore, as shown in FIG. 12, the proximal tapered part 22 may have the outer protrusion part 62. The proximal tapered part 22 having the outer protrusion part 62 can secure the stiffness of the balloon 2 at the proximal tapered part 22, which can prevent elongation of the balloon 2 in the longitudinal axis direction.

As shown in FIG. 13, the balloon body 20 preferably has a proximal sleeve part 21 located proximal to the proximal tapered part 22. When the distal tapered part 24 has the first part 610 and the second part 620 and the proximal tapered part 22 does not have the inner protrusion part 61 as described above, preferably, the proximal sleeve part 21 and the proximal tapered part 22 have the outer protrusion part 62 and does not have the inner protrusion part 61. The proximal tapered part 22 and the proximal sleeve part 21 that have the outer protrusion part 62 can not only secure the stiffness of the proximal side of the balloon 2 to prevent elongation of the balloon 2 in the axis direction but also prevent problems such as collapsing of the balloon 2 when the fluid is discharged to deflate the balloon 2. In addition, the proximal sleeve part 21 that does not have the inner protrusion part 61 allows the fluid to be introduced or discharged in a shorter time when inflating or deflating the balloon 2 by introducing or discharging the fluid into or from the balloon 2, thereby reducing the burden on the patient.

In the above case, as shown in FIG. 13, the outer protrusion part 62 of the proximal sleeve part 21 and the outer protrusion part 62 of the proximal tapered part 22 preferably extend continuously in the longitudinal axis direction of the balloon body 20. The outer protrusion part 62 of the proximal sleeve part 21 and the outer protrusion part 62 of the proximal tapered part 22 that extend continuously in the longitudinal axis direction of the balloon body 20 can further prevent the proximal side of the balloon 2 from elongating.

Furthermore, as shown in FIG. 13, the straight tubular part 23 may have the outer protrusion part 62. In this case, the protrusion part 62 of the proximal tapered part 22 and the protrusion part 62 of the straight tubular part 23 preferably extend continuously in the longitudinal axis direction of the balloon body 20. The outer protrusion part 62 extending from the proximal sleeve part 21, through the proximal tapered part 22, to the straight tubular part 23 can further prevent the part of the balloon 2 from the straight tubular part 23 to the proximal side from elongating.

As shown in FIG. 14, the balloon 2 for a balloon catheter may have a configuration where the proximal tapered part 22 has the first part 610 and the second part 620, and the distal tapered part 24 does not have the inner protrusion part 61. The proximal tapered part 22 having the second part 620 that does not have the inner protrusion part 61 inside, which hinders the balloon 2 from being folded, allowing the balloon 2 to be easily folded when deflated and reduce the outer diameter of the balloon 2. The smaller outer diameter of the proximal side of the balloon 2 allows the balloon catheter 1 to be easily withdrawn from a body cavity. In addition, the proximal tapered part 22 having the outer protrusion part 62 in the entire extent of the second part 620 that does not have the inner protrusion part 61 can ensure the stiffness of the balloon 2 and prevent the balloon 2 from elongating in the longitudinal axis direction when, for example, introducing fluid such as pressurized fluid in the balloon 2 to inflate the balloon 2. Furthermore, since the distal tapered part 24 does not have the inner protrusion part 61, the balloon 2 can be easily folded also on the distal side. As shown in FIG. 14, the distal tapered part 24 may have the outer protrusion part 62. The distal tapered part 24 having the outer protrusion part 62 can secure the stiffness of the balloon 2 in the distal tapered part 24, which can prevent elongation of the balloon 2 in the longitudinal axis direction. In addition, the distal tapered part 24 having the outer protrusion part 62 is useful for treatments in which the balloon catheter 1 is crawled forward to incise and dilate the lesion.

Materials forming the balloon body 20 include, for example, polyolefin-based resin such as polyethylene, polypropylene, ethylene-propylene copolymer; polyester-based resin such as polyethylene terephthalate and polyester elastomer; polyurethane-based resin such as polyurethane and polyurethane elastomer; polyphenylene sulfide-based resin; polyamide-based resin such as polyamide and polyamide elastomer; fluorine-based resin; silicone-based resin; and natural rubber such as latex rubber. Only one of these may be used, or two or more may be used in combination. Of these, polyamide-based resin, polyester-based resin, and polyurethane-based resin are preferably used. In particular, elastomer resin is preferably used from the viewpoint of thinning and flexibility of the balloon body 20. For example, among polyamide-based resins, nylon 12, nylon 11, and the like are suitable for the resin forming the balloon body 20, and more preferably nylon 12 because it is relatively easy to mold when blow molding. Polyamide elastomers such as polyether ester amide elastomer and polyamide ether elastomer are also preferred in terms of thinning and flexibility of the balloon body 20. Of these, polyether ester amide elastomer is preferred in terms of high yield strength and good dimensional stability of the balloon body 20.

The outer protrusion part 62 and the inner protrusion part 61 are preferably made of the same material as the balloon body 20. When the outer protrusion part 62 and the inner protrusion part 61 are made of the same material as the balloon body 20, the outer protrusion part 62 and the inner protrusion part 61 are less likely to damage the outer surface of the balloon body 20 while maintaining the flexibility of the balloon 2. Preferably, the balloon body 20, the outer protrusion part 62, and the inner protrusion part 61 are integrally molded. This can prevent the outer protrusion part 62 and the inner protrusion part 61 from falling off from the balloon body 20.

The balloon 2 can be produced, for example, by placing a cylindrical parison 200 made of resin as shown in FIG. 15 in a mold having a groove in its lumen, and biaxially stretch-blow molding it. The outer protrusion part 62 can be formed, for example, by inserting the parison 200 into the lumen of the mold, allowing a thick-walled portion 220 of the parison to enter the groove of the mold, and introducing fluid into the lumen 210 of the parison 200 to expand the parison 200. The inner protrusion part 61 can be formed, for example, by pressing the thick-walled portion 220 of the parison 200 against the part of the mold without the groove, and introducing fluid into the lumen 210 of the parison 200 to expand the parison 200. As for the materials forming the parison 200, reference can be made to the above description of the materials forming the balloon body 20.

Materials forming the shaft 3 include, for example, polyamide-based resin, polyester-based resin, polyurethane-based resin, polyolefin-based resin, fluorine-based resin, polyvinyl chloride-based resin, silicone-based resin, and natural rubber. Only one of these may be used, or two or more may be used in combination. Of these, the material forming the shaft 3 is preferably at least one of polyamide-based resin, polyolefin-based resin, and fluorine-based resin. This can improve surface slipperiness of the shaft 3 and improve the insertion of the balloon catheter 1 into the body cavity.

The balloon 2 and the shaft 3 may be joined by adhesive bonding, welding, or by attaching a ring-shaped member at the point where the end of the balloon 2 and the shaft 3 overlap to swage them. Of these, the balloon 2 and the shaft 3 are preferably joined by welding. By welding the balloon 2 and the shaft 3, the bond between the balloon 2 and the shaft 3 is difficult to be released even when the balloon 2 is repeatedly inflated and deflated, easily increasing the strength of the bond between the balloon 2 and the shaft 3.

As shown in FIG. 1, a hub 4 may be provided at a proximal side of the shaft 3, and the hub 4 may be provided with a fluid inlet 7 that is connected to the flow channel of the fluid supplied to the interior of the balloon 2. In addition, the hub 4 preferably has a guidewire insertion port 5 that is connected to the guidewire insertion channel. The balloon catheter 1 having the hub 4 provided with the fluid inlet 7 and the guidewire insertion port 5 can facilitate the operation of supplying fluid inside the balloon 2 to inflate and deflate the balloon 2 and delivering the balloon catheter 1 to a lesion site along a guidewire. The balloon 2 in accordance with embodiments of the present invention is applicable not only to the above-described balloon catheter, which is a so-called over-the-wire balloon catheter in which the guidewire is inserted over the distal to the proximal side of the shaft, but also to a so-called rapid exchange balloon in which the guidewire is inserted from the distal side to the midway of the proximal side of the shaft.

The shaft 3 and the hub 4 may be joined by, for example, adhesive bonding or welding. Of these, the shaft 3 and the hub 4 are preferably joined by adhesive bonding. The adhesive bonding of the shaft 3 and the hub 4 can increase the bonding strength of the shaft 3 and the hub 4 to increase durability of the balloon catheter 1 when the materials forming the shaft 3 and the hub 4 are different, for example, in a case where the shaft 3 is made of material having high flexibility and the hub 4 is made of material having high stiffness.

The present application claims priority based on Japanese Patent Application No. 2020-190296 filed on Nov. 16, 2020. All the contents described in Japanese Patent Application No. 2020-190296 filed on Nov. 16, 2020 are incorporated herein by reference.

DESCRIPTION OF REFERENCE SIGNS

1: balloon catheter
2: balloon
3: shaft
4: hub
5: guidewire insertion port
7: fluid inlet
20: balloon body
21: proximal sleeve part
22: proximal tapered part
23: straight tubular part
24: distal tapered part
31: outer tube
32: inner tube
61: inner protrusion part
62: outer protrusion part
200: parison
210: lumen of the parison
220: thick-walled portion of the parison
610: first part
620: second part
$C_i$: inner circle having the same radius as the inner radius of the balloon body
$C_o$: outer circle having the same radius as the outer radius of the balloon body
$r_i$: radius of the inner circle
$r_o$: radius of the outer circle
IC: inscribed circle of the inner protrusion part
CC: circumscribed circle of the outer protrusion part
$r_{IC}$: radius of the inscribed circle of the inner protrusion part
$r_{CC}$: radius of the circumscribed circle of the outer protrusion part
$D_0$: position of 0%
$D_{100}$: position of 100%

The invention claimed is:

1. A balloon for a balloon catheter, comprising:
a balloon body having an outer surface and an inner surface, wherein
the balloon body has a straight tubular part, a distal tapered part located distal to the straight tubular part, and a proximal tapered part located proximal to the straight tubular part, and the balloon satisfies the following (1) or (2) or both (1) and (2):
(1) in a longitudinal axis direction of the balloon body, the distal tapered part has a first part having an inner protrusion part that projects radially inwardly from an inner surface of the balloon body and extends in the longitudinal axis direction of the balloon body, and a second part that is an entire remaining section of the distal tapered part excluding the first part and does not have the inner protrusion part;
the second part of the distal tapered part is provided adjacent to the straight tubular part, so that the first part of the distal tapered part is not provided on a side nearer the straight tubular part than the second part of the distal tapered part; and
the distal tapered part has an outer protrusion part that projects radially outwardly from the outer surface of the balloon body and extends in the longitudinal axis direction of the balloon body in the entire extent of the second part, and
(2) in the longitudinal axis direction of the balloon body, the proximal tapered part has a first part having an inner protrusion part that projects radially inwardly from an inner surface of the balloon body and extends in the longitudinal axis direction of the balloon body, and a second part that is an entire remaining section of the proximal tapered part excluding the first part and does not have the inner protrusion part;
the second part of the proximal tapered part is provided adjacent to the straight tubular part, so that the first part of the proximal tapered part is not provided on a side nearer the straight tubular part than the second part of the proximal tapered part; and
the proximal tapered part has an outer protrusion part that projects radially outwardly from the outer surface of the balloon body and extends in the longitudinal axis direction of the balloon body in the entire extent of the second part.

2. The balloon for a balloon catheter according to claim 1, wherein the outer protrusion part and the inner protrusion part are arranged in the same circumferential position of the balloon body in the (1) or (2) or both (1) and (2).

3. The balloon for a balloon catheter according to claim 1, wherein the second part is provided over a section at least from a position of 0% to a position of 10% of at least one of the distal tapered part and the proximal tapered part, where each end of the distal tapered part and the proximal tapered part adjacent to the straight tubular part is defined as the position of 0% and each of the other ends of the distal tapered part and the proximal tapered part is defined as a position of 100% in the longitudinal axis direction of the balloon body.

4. The balloon for a balloon catheter according to claim 1, wherein the balloon has the outer protrusion part in the entire extent of the first part in the (1) or (2) or both (1) and (2).

5. The balloon for a balloon catheter according to claim 1, wherein the straight tubular part has the outer protrusion part.

6. The balloon for a balloon catheter according to claim 5, satisfying the following (3) or (4) or both (3) and (4):

(3) the outer protrusion part of the distal tapered part and the outer protrusion part of the straight tubular part extend continuously in the longitudinal axis direction of the balloon body, and (4) the outer protrusion part of the proximal tapered part and the outer protrusion part of the straight tubular part extend continuously in the longitudinal axis direction of the balloon body.

7. The balloon for a balloon catheter according to claim 5, wherein the outer protrusion part is provided at least at a position of 60% of at least one of the distal tapered part and the proximal tapered part, and a height of the outer protrusion part at the position of 60% is the same as or lower than a height of the outer protrusion part in the straight tubular part, where each of ends of the distal tapered part and the proximal tapered adjacent to the straight tubular part is defined as a position of 0%, and each of the other ends of the distal tapered part and the proximal tapered part is defined as a position of 100% in the longitudinal axis direction of the balloon body, and difference between a radius of an outer circle equivalent to an outer diameter of the balloon body and a radius of a circumscribed circle passing through a top end of the outer protrusion part and having a common center to that of the outer circle in a plane perpendicular to the longitudinal axis direction of the balloon body is defined as the height of the outer protrusion part.

8. The balloon for a balloon catheter according claim 5, wherein the outer protrusion part is provided at least at a position of 40% of at least one of the distal tapered part and the proximal tapered part, and a height of the outer protrusion part at the position of 40% is the same as or lower than a height of the outer protrusion part in the straight tubular part, where each of ends of the distal tapered part and the proximal tapered adjacent to the straight tubular part is defined as a position of 0%, and each of the other ends of the distal tapered part and the proximal tapered part is defined as a position of 100% in the longitudinal axis direction of the balloon body, and difference between a radius of an outer circle equivalent to an outer diameter of the balloon body and a radius of a circumscribed circle passing through a top end of the outer protrusion part and having a common center to that of the outer circle in a plane perpendicular to the longitudinal axis direction of the balloon body is defined as the height of the outer protrusion part.

9. The balloon for a balloon catheter according to claim 1, wherein the outer protrusion part is provided in a section at least from a position of 20% to a position of 80% of at least one of the distal tapered part and the proximal tapered part, and the balloon satisfies the following (5) or (6) or both (5) and (6):

(5) a height of the outer protrusion part at the position of 80% of the distal tapered part is the same as or lower than a height of the outer protrusion part at the position of 20% of the distal tapered part, and (6) a height of the outer protrusion part at the position of 80% of the proximal tapered part is the same as or lower than a height of the outer protrusion part at the position of 20% of the proximal tapered part, where each of ends of the distal tapered part and the proximal tapered adjacent to the straight tubular part is defined as a position of 0%, and each of the other ends of the distal tapered part and the proximal tapered part is defined as a position of 100% in the longitudinal axis direction of the balloon body, and difference between a radius of an outer circle equivalent to an outer diameter of the balloon body and a radius of a circumscribed circle passing through a top end of the outer protrusion part and having a common center to that of the outer circle in a plane perpendicular to the longitudinal axis direction of the balloon body is defined as the height of the outer protrusion part.

10. The balloon for a balloon catheter according to claim 1, wherein the first part is provided in a section at least from a position of 80% to the position of 100% of at least one of the distal tapered part and the proximal tapered part, and the balloon satisfies the following (7) or (8) or both (7) and (8):

(7) a height of the inner protrusion part at a position of 90% of the distal tapered part is the same as or higher than a height of the inner protrusion part at the position of 80% of the distal tapered part, and (8) a height of the inner protrusion part at a position of 90% of the proximal tapered part is the same as or higher than a height of the inner protrusion part at the position of 80% of the proximal tapered part, where each of ends of the distal tapered part and the proximal tapered adjacent to the straight tubular part is defined as a position of 0%, and each of the other ends of the distal tapered part and the proximal tapered part is defined as a position of 100% in the longitudinal axis direction of the balloon body, and difference between a radius of an inner circle equivalent to an inner diameter of the balloon body and a radius of an inscribed circle passing through a top end of the inner protrusion part and having a common center to that of the inner circle in a plane perpendicular to the longitudinal axis direction of the balloon body is defined as the height of the inner protrusion part.

11. The balloon for a balloon catheter according to claim 1, wherein the distal tapered part has the first part and the second part, and the proximal tapered part does not have the inner protrusion part.

12. The balloon for a balloon catheter according to claim 11, wherein the balloon body has a proximal sleeve part located proximal to the proximal tapered part, and the proximal sleeve part and the proximal tapered part have the outer protrusion part and do not have the inner protrusion part.

13. The balloon for a balloon catheter according to claim 12, wherein the outer protrusion part of the proximal sleeve part and the outer protrusion part of the proximal tapered part extend continuously in the longitudinal axis direction of the balloon body.

14. The balloon for a balloon catheter according to claim 12, wherein the straight tubular part has the outer protrusion part, and the protrusion part of the proximal tapered part and the protrusion part of the straight tubular part extend continuously in the longitudinal axis direction of the balloon body.

15. The balloon for a balloon catheter according to claim 1, wherein the proximal tapered part has the first part and the second part, and the distal tapered part does not have the inner protrusion part.

16. The balloon for a balloon catheter according to claim 1, the outer protrusion part and the inner protrusion part are composed of the same material as the balloon body.

* * * * *